No. 680,311. Patented Aug. 13, 1901.
G. H. BROWNE.
BOOK.
(Application filed Sept. 25, 1900.)
(Model.)
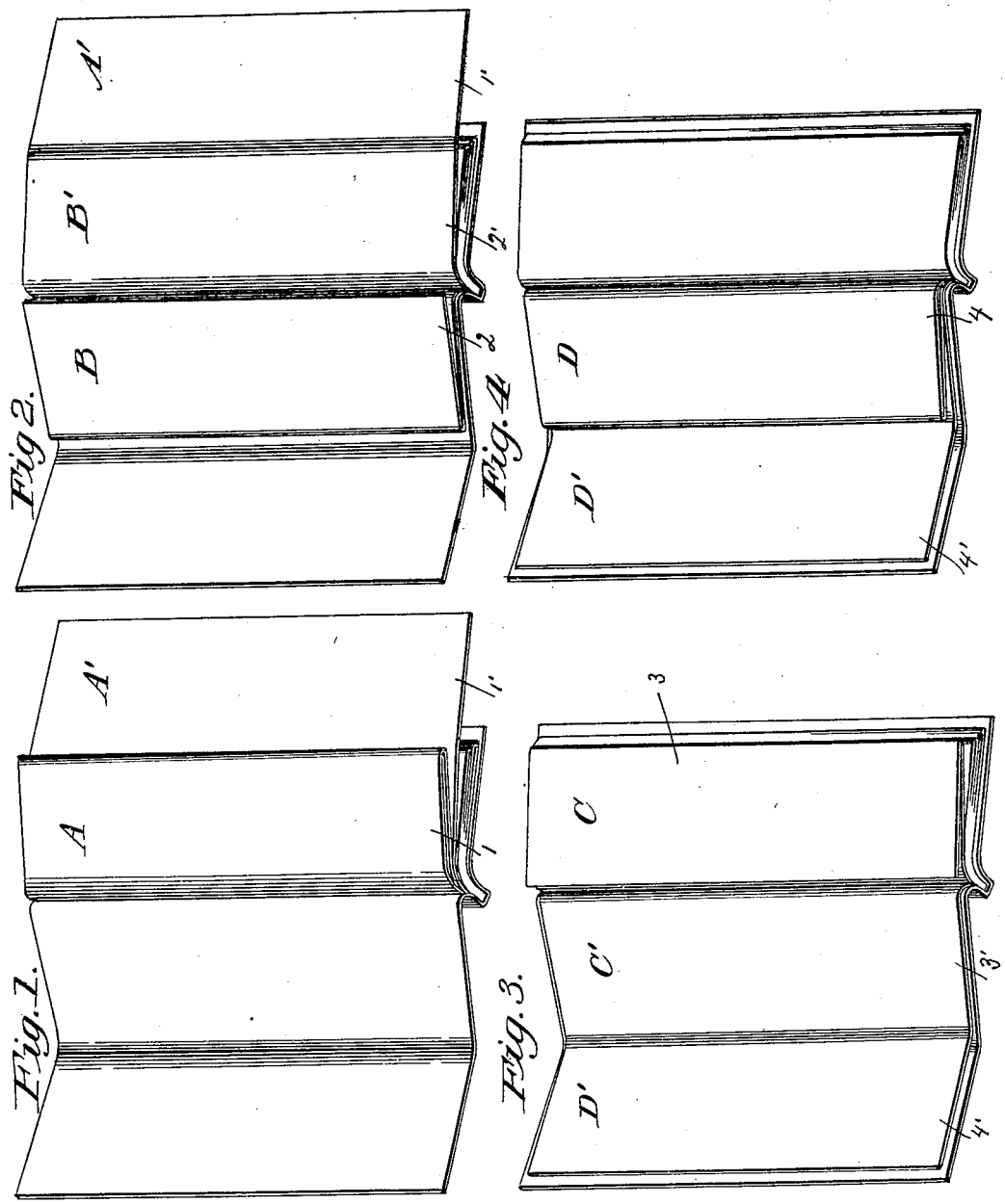

UNITED STATES PATENT OFFICE.

GEORGE H. BROWNE, OF CAMBRIDGE, MASSACHUSETTS.

BOOK.

SPECIFICATION forming part of Letters Patent No. 680,311, dated August 13, 1901.

Application filed September 25, 1900. Serial No. 31,065. (Model.)

*To all whom it may concern:*

Be it known that I, GEORGE H. BROWNE, a citizen of the United States, residing at Cambridge, in the county of Middlesex and State of Massachusetts, have invented certain new and useful Improvements in Books; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to certain new and useful improvements in books; and it has for its object the provision of a book adapted particularly for the use of students in the study of languages, the book being equally well adapted to any of the various uses in which it may be desirable to have printed in connection with the text proper supplemental matter of any kind which is designed to be normally concealed, but adapted to be brought into view in connection with the text when for any reason this may be desired—as, for instance, in the printing of puzzles, pictures, or designs, in which cases the puzzle proper would be printed upon the pages of the book which are normally visible, while the answer or solution of the puzzle would be printed upon the pages or surfaces which are normally hidden, but which could be readily brought into view in connection with the text proper, as will be hereinafter more fully described.

The invention therefore contemplates, broadly, the construction of a book, such as will hereinafter be described, in which a series of normally visible pages are employed in connection with an equal number of pages which by the folding of the original pages are normally invisible.

To these ends, and to such others as the invention may pertain, the same consists, further, in the novel construction, combination, and adaptation of parts, as will be hereinafter more fully described and then specifically defined in the appended claim.

The invention is clearly illustrated in the accompanying drawings, which, with the characters of reference marked thereon, form part of this application, and in which—

Figures 1, 2, 3, and 4 are respectively perspective views of a book embodying my invention, the said views showing in succession four of the positions or combinations assumed by the folding of the pages necessary in demonstrating the use of the book.

For the purpose of describing the invention I will in the present instance consider that the book is to be used as a German-English vocabulary for students' use. In order to test the memory of the student in the study of the German language, it is essential that the English words should be kept normally out of sight, and yet the said words should be so arranged as to be readily brought into view, arranged in a column parallel to the column containing the German words, and in illustration I have in the drawings designated by the numerals 1 2 3 &c., the sections of the pages upon which the German words are to be printed, said pages bearing, respectively, the identifying-letters "A," "B," "C," &c., and upon counterpart page-sections (designated by numerals 1' 2' 3' 4', &c., and bearing, respectively, the identifying-letters "A'," "B'," "C'," &c.,) I have indicated the sections upon which the corresponding words in English are printed in columns.

In the manufacture of the book the pages are printed flat and in double column, the space between the columns being sufficient to permit of the pages being folded upon lines extending through their longitudinal centers. The leaves of the book thus printed are folded along the longitudinal lines of the pages in such manner as to produce a book having double the number of pages, each of the pages thus produced by the folding consisting of a single column, with the leaves folded in such a manner as to bring the key to the original text upon the normally invisible faces of the pages throughout the book, so that if the book, as in the present illustration, is to be used as a German-English vocabulary the turning of the folded single-column pages will normally present to the eye the columns containing the German words, the columns containing the corresponding words in English being printed upon the backs of the pages containing the German words and being hidden by the folding of the pages.

We will suppose that page 1 has printed thereon a column of words printed in German. The student finds it necessary to refer to the column containing the corresponding English words. To do this, it is necessary that he should unfold the second page of the book, thus bringing into view the single-column English-printed page 1', which is the key to 1, as shown in Fig. 1 of the drawings. The key to the page 2 is in like manner brought into view and into parallel relationship to the page 2 by unfolding the second page of the book, upon which page appear the two columns 1' and 2', the column 2' containing the words which are the key to the words printed upon page 2, being thus brought into parallel position, both of which are visible. In order to render the page 3' (the key to 3) visible and to bring the same into parallel relationship to the column 3, it is simply necessary to unfold the section of the first page upon which the column 2 is printed, thus bringing into view the column 3'—the key to 3. In order to produce the column 4', carrying the key to 4, the page 4 is folded back over the page containing 3', &c.

It will be at once evident that my invention will be found to be equally well adapted to any of the various uses in which it may be found desirable to have normally exposed to view the text proper, with the key to the text so printed relative to the text proper as to permit the key to be quickly and easily made visible and brought into parallel relationship with the text proper, so as to admit of ready comparison, but which key is normally hidden from view.

Having thus described my invention, what I claim to be new, and desire to secure by Letters Patent, is—

In a book of the character described, a series of leaves, each of which is folded upon itself longitudinally at its middle portion, the outer faces of each leaf when thus folded displaying a column of text printed thereon, the inner faces of each leaf, which are normally hidden when the leaves are folded upon themselves, containing printed matter thereon which is the counterpart of one of the leaves of text, whereby when one of the leaves containing the counterpart of a sheet of text is opened out, the column on the latter and the column printed on the counterpart sheet may be read line for line with each other, as set forth.

In testimony whereof I affix my signature in presence of two witnesses.

GEORGE H. BROWNE.

Witnesses:
DAVID M. WEBSTER,
NELLIE SUPPLE.